United States Patent [19]
Muller

[11] Patent Number: 5,812,638
[45] Date of Patent: Sep. 22, 1998

[54] TELEPHONE OPERATOR MID-CALL QUEUING INTERVAL SYSTEM AND ASSOCIATED METHOD

[75] Inventor: Michael J. Muller, Boulder, Colo.

[73] Assignee: U S West, Inc., Englewood, Colo.

[21] Appl. No.: 614,419

[22] Filed: Mar. 8, 1996

[51] Int. Cl.⁶ ...................................................... H04M 3/42
[52] U.S. Cl. .............................. 379/88; 379/67; 379/265; 379/214
[58] Field of Search ................................ 379/67, 88, 89, 379/213, 214, 265, 266

[56] References Cited

U.S. PATENT DOCUMENTS

| | | | |
|---|---|---|---|
| 4,623,761 | 11/1986 | Winter et al. | 379/84 |
| 4,697,282 | 9/1987 | Winter et al. | 379/67 |
| 4,734,930 | 3/1988 | Quiros et al. | 379/88 |
| 4,918,322 | 4/1990 | Winter et al. | 379/88 |
| 5,014,303 | 5/1991 | Velius | 379/88 |
| 5,396,542 | 3/1995 | Alger et al. | 379/67 |
| 5,422,937 | 6/1995 | Ferrara | 379/214 |
| 5,442,693 | 8/1995 | Hays et al. | 379/213 |
| 5,479,488 | 12/1995 | Lennig et al. | 379/67 |
| 5,526,417 | 6/1996 | Dezonno | 379/214 |
| 5,539,818 | 7/1996 | Zdenek et al. | 379/265 |
| 5,544,232 | 8/1996 | Baker et al. | 379/265 |

Primary Examiner—Krista Zele
Assistant Examiner—Daniel S. Hunter
Attorney, Agent, or Firm—Holme, Roberts & Owen

[57] ABSTRACT

A method for handling incoming callers to a call processing system such as a directory assistance facility, and associated system is disclosed. The method includes the steps of recording a greeting message from an operator, recording information provided by an incoming caller, replaying the recorded information provided by the incoming caller to the operator to enable the operator to conduct a search and replaying the recorded greeting from the operator to the incoming caller during a replay interval, which is defined as the period in which the recorded information provided by the incoming caller is played back to the operator. The method may further include the step of modifying at least one of the recorded incoming caller information and the recorded message from the operator such that the duration of the recorded message from the operator is less than or substantially equal to the duration of the recorded incoming caller information.

45 Claims, 5 Drawing Sheets

TELEPHONE OPERATOR MID-CALL QUEUING INTERVAL SYSTEM AND ASSOCIATED METHOD

FIELD OF THE INVENTION

The present invention relates to a method and system for processing incoming calls to a call processing facility, and in particular, to a method and system for partially automating directory assistance calls.

BACKGROUND OF THE INVENTION

Directory assistance operators typically handle a large number of incoming calls during the course of a work day. Due to the large volume of incoming calls received and handled by each operator, different approaches have been taken to reduce operator response time and thereby increase customer satisfaction, and to reduce the work load on operators and thereby increase operator efficiency. One such approach involves partial automation of the initial stage of the directory assistance call, wherein the incoming caller is greeted by an automated system. In this regard, for a given load to an operator, partially automated systems have been developed and implemented into the initial stages of a directory assistance call to reduce the time customers wait for service and to reduce the work load of the operator by greeting the incoming caller and by initially prompting the incoming caller for information by asking the incoming caller the locality to be searched. In certain instances however, there may be a delay after the incoming caller provides the relevant information (e.g., locality and/or directory listing for which a telephone number is sought) and before being connected with an operator.

SUMMARY OF THE INVENTION

Accordingly, it is a primary object of the present invention to provide partially automated directory assistance and a system for handling incoming callers to directory assistance.

It is another object of the present invention to provide a partially automated directory assistance system and associated method which, for a given load of incoming callers to the operator, increases customer satisfaction by reducing operator response time.

It is another object of the present invention to provide a method for handling incoming callers to a directory assistance system which increases operator efficiency by reducing the operator's work load.

To achieve one or more of these objective, the present invention includes a method for handling an incoming caller in a call processing system (e.g., directory assistance facility) which includes the steps of recording a greeting message by an operator, recording information provided by the incoming caller (e.g., locality and directory listing of the entity for which a telephone number is sought by the incoming caller), replaying the recorded information provided by the incoming caller to the operator to enable the operator to conduct a search using the incoming caller information, and replaying the recorded greeting message by the operator to the incoming caller during a replay interval, which is defined as the period in which the recorded information from the incoming caller is played back to the operator. In this regard, the operator's recorded message is played to the incoming caller while the operator receives the information provided by the incoming caller to initiate the search for the requested information. Of importance, the present invention increases customer satisfaction by reducing the operator's response time for a give n load of directory assistance calls and by reducing any delays in servicing the customer. In addition, the present invention increases operator efficiency by reducing the operator's workload.

In one aspect of the present invention, the method contemplates calculating the difference between the duration for playing back the recorded incoming caller information and the duration for playing back the recorded greeting message to obtain a duration offset. The duration offset may then be used to reconfigure one of the recorded messages so that the recorded operator's message to the incoming caller is played back and ends before or substantially simultaneously with the end of the playing back of the recorded incoming caller information to the operator. In one embodiment, where the duration of the recorded incoming information is greater than the duration of the recorded greeting message by the operator, the recorded operator's message may be reconfigured by adding a period of silence to the recorded operator's message to the incoming caller, the period of silence having a duration not greater than the duration offset.

In another aspect of the invention, in order to have the recorded operator's greeting message to the incoming caller end before or at the time the recorded incoming caller information is completely played back to the operator, the method contemplates calculating a ratio of the duration of the recorded incoming caller information to the duration of the recorded greeting message. In this regard, if the duration of the recorded incoming caller information is less than the duration of the recorded operator's greeting message, the recorded operator's greeting message may be compressed by a compression factor equal to the above-noted ratio to thereby decrease the length of time for playing back the recorded operator's greeting message to the incoming caller. Conversely, if the duration of the recorded incoming caller information is greater than the duration of the recorded operator's greeting message, the recorded operator's greeting message may be expanded by an expansion factor equal to the above-noted ratio to thereby increase the length of time for playing back the recorded operator's greeting message to the incoming caller.

In yet another aspect of the present invention, the method provides for the operator recording a number of greeting messages of differing durations. In this regard, the duration of the recorded incoming caller information may be calculated and compared with the durations of the many greeting messages by the operator. A recorded operator's greeting message having a duration not greater than the recorded incoming caller information may then be selected such that the recorded operator's greeting message to the incoming caller ends before or as the recorded incoming caller information is finished playing back to the operator.

In a further aspect of the invention, to reduce the operator's response time and work load and thereby increase customer satisfaction and operator efficiency for a given load, speech recognition may be performed on at least a portion of the information provided by the incoming caller. The speech recognized information may be communicated to the operator visually. In this regard, the operator response time and work load may be reduced as the operator will only have to input one piece of information (e.g., the name of the listing to be searched), rather than two pieces of information (e.g., locality and name) as the locality may be directly inputted into the operator's terminal for searching. For example, due to the significant number of instances in which incoming callers requires information for the same locality, speech recognition may be performed on the locality information provided by the incoming caller and the name of the listing to be searched may be recorded. The locality information may be communicated to the operator via a display at the operator's terminal and the name of the entity to be searched may be communicated to the operator by playing back the information to the operator. In this regard, the operator's work load has been reduced as the operator has only to input the name of the entity to be searched. Such speech recognition also reduces the duration of incoming caller information communicated to the operator as the speech recognized information (e.g., locality) is directly inputted into the operator's search system. Consequently, the duration of playing back the recorded operator's message to the incoming caller is reduced, thus increasing customer satisfaction and increasing the efficiency of the operators.

The present invention also achieves one or more of the objectives by providing a system for processing calls from incoming callers. In one aspect, the system includes a processor for processing information provided by the incoming caller (e.g., locality and/or directory listing for the telephone number sought), a communicator for providing the incoming caller information to the operator to enable the operator to conduct a search for the telephone number based upon the incoming caller information, a recorder for recording one or more messages by an operator, and a replayer for playing back the operator's recorded messages to the incoming caller while the incoming caller information is being communicated to the operator.

In one embodiment of the system of the present invention, the processor comprises a recorder for recording the information provided by the incoming caller and the communicator comprises a replaying device for playing back the recorded incoming caller information to the operator. In another embodiment, the processor comprises a speech recognition system capable of identifying at least a portion of information provided by the incoming caller, such as the locality of the listing desired. Information processed by a speech recognition system may be transferred and inputted directly to the assigned operator's terminal for purposes of conducting the directory assistance search. In this regard, the communicator for this embodiment comprises a display means, such as a computer screen. This substantially reduces the operator's work load as the operator has only one piece of information to input (e.g., type) into the operator's computer terminal for purposes of conducting the search, namely, the directory listing of the entity for which a telephone number is desired.

In another aspect of the invention, the system may further comprise a means for calculating the durations for playing back the operator's recorded message and for communicating the incoming caller information to the operator, and a means for calculating the difference therebetween (i.e., the duration offset). In this regard, where the durations are not substantially equal, the system may further comprise a means for providing a period of silence to the incoming caller in conjunction with the operator's message or, alternatively, a means for altering the duration of the one of the durations for communicating the information provided by the incoming caller to the operator and for playing the operator's message to the incoming caller.

DETAILED DESCRIPTION

The call processing system of the present invention is generally used to process incoming callers to a directory assistance facility. Incoming callers typically seek the telephone number of a party by providing relevant information to the operator, such as the locality and directory listing (e.g., name of person or business) of the party.

Figure 1:
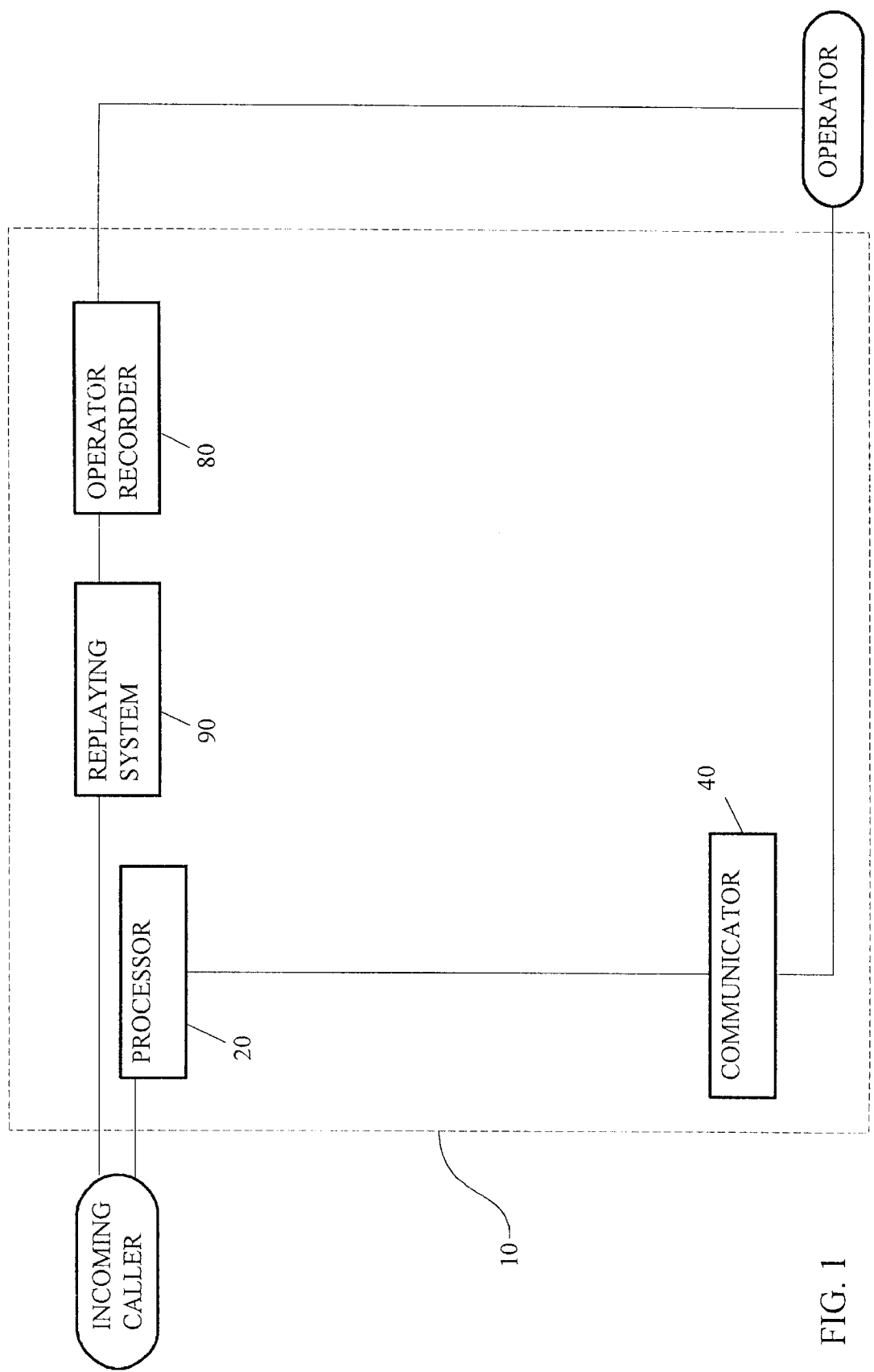
FIG. 1 is a diagrammatic illustration showing one embodiment of the call handling system according to the present invention.

FIG. 1 is a block diagram which generally illustrates the call processing system 10 of the present invention. The call processing system 10 may generally comprise a processor 20 for processing the information provided by the incoming caller, a communicator 40 for providing the incoming caller information to the operator such that the operator may conduct a search using the incoming caller information, a recorder 80 for recording one or more messages from an operator and a replaying system 90 for playing back a recorded message by the operator to the incoming caller while the incoming caller information is being communicated to the operator. In this regard, the system 10 may increase operator efficiency by partially automating the directory assistance call and may increase customer satisfaction by reducing operator response time and by providing a message from the operator to the incoming caller during a period during which the incoming caller may otherwise experience a delay.

Figure 2:
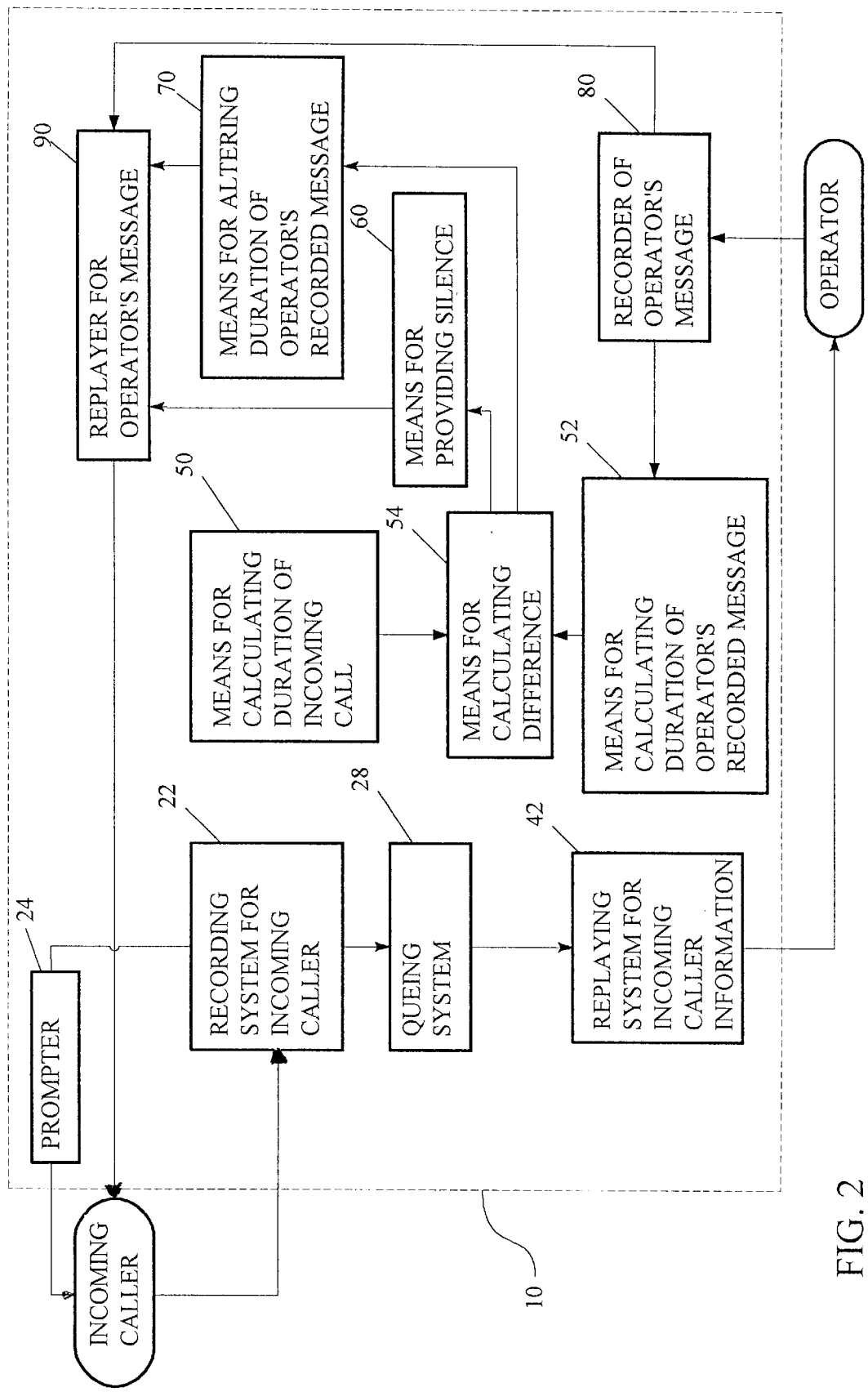
FIG. 2 is a diagrammatic illustration of another embodiment of the call handling system according to the present invention.
Figure 3:
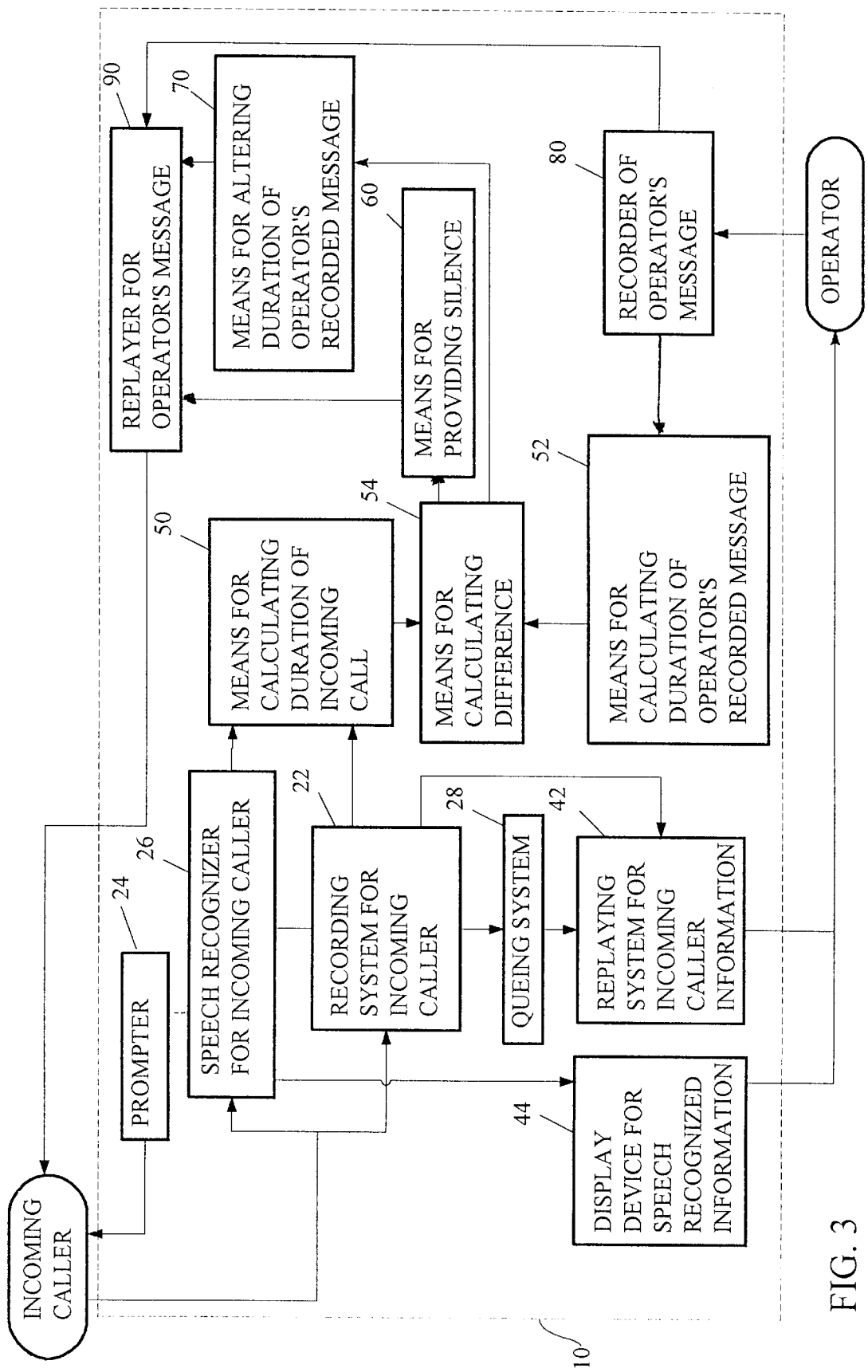
FIG. 3 is a diagrammatic illustration of yet another embodiment of the call handling system according to the present invention.

FIGS. 2–3 illustrate block diagrams of embodiments of the incoming caller processing system 10 of the present invention. In this embodiment, illustrated in FIG. 2, the processor for processing information provided by the incoming caller comprises a recording device 22 which is capable of recording and at least temporarily storing the information provided by the incoming caller. In this regard, the recorder 22 may record and/or store the incoming caller's voice as the incoming caller indicates the locality (e.g., city) and directory listing (e.g., person's or business' name) to be searched by the operator. The recorder 22 may also record and/or store the incoming caller's language selection and the department requested. The recorder 22 may be a conventional system and the functions of the recorder 22 may be incorporated into a system called "Automated Directory Assistance Systems" ("ADAS"), which is commercially available from Nortel (formerly "Northern Telecom") and described in documentation accompanying the ADAS.

For purposes of reducing the operator's workload and the monotony of answering directory assistance inquiries for a given load, the recording device 22 may be used in conjunction with a prompting device 24 for conducting an automated initial dialogue with the incoming caller. The prompting device 24 is capable of presenting the incoming caller with preselected messages concerning the locality the incoming caller wishes to be searched, and the directory listing desired. In this regard, prerecorded messages may be played back to the incoming caller in order to prompt the incoming caller with inquiries such as, "For what city?" and/or "For what listing?" in order to elicit the relevant information for the telephone number of the listing desired by the incoming caller. In addition, for purposes of advising the incoming caller as to the service being provided, the prompting device 24 may also advise the incoming caller, prior to the inquiries for the city and listing to be searched, of the service being provided. In this regard, upon connection between the incoming caller and the call processing system 10, the prompting device 24 may play back to the incoming caller a recorded message, such as "U S West, welcome to directory assistance." The prompting device 24 may be a conventional system, the function of which may be incorporated into the above-referenced ADAS.

As illustrated in FIGS. 1–5, once the information provided by the incoming caller has been recorded and/or stored by the recorder 22, the information provided by the incoming caller may be forwarded or communicated to the operator, who will use the information to search for the telephone number of the desired party. In some instances, such as high volume periods, the incoming caller may not be immediately connectable with an operator. In order to effectively provide directory assistance during such high-demand periods, the incoming caller processing system 20 may include a conventional queuer 28 for queuing the incoming callers, as illustrated in FIGS. 2–3 The queuer 28 serves as a reservoir by holding incoming callers until an operator is available. The queuer 28 may be conventionally implemented in a switch, such as a 5ESS switch or a 1AESS switch, which are commercially available from AT&T, or a DMS 100 switch commercially available from Nortel (not shown) to link the operator (i.e., operator's terminal) to an incoming caller in the queue.

As illustrated in FIGS. 1–3, the incoming caller processing system also includes a communicator 40 for providing incoming caller information to the operator. In one embodiment, shown in FIG. 2, the communicator comprises an audio device, namely, a replayer 42 for playing back to the operator the information (e.g., locality, name) provided by the incoming caller. In this regard, once an operator has been assigned, for example, by the queuer 28, the replayer 42 plays the incoming caller information back to the operator via the operator's headset to enable the operator to input (e.g., type) the relevant information into the operator's terminal for searching. The replayer 42 may be operatively associated (e.g., linked) with the prompter 24 to facilitate obtaining information from the incoming caller and transferring the incoming caller information to the operator. As such, the above-referenced ADAS available from Nortel may incorporate the functions of the replayer 42.

In an alternative embodiment, illustrated in FIG. 3, the processor for processing incoming caller information comprises a device 26 capable of performing speech recognition on at least the locality specified by the incoming caller. The processor may also comprise a recorder 22 which works in concert with the speech recognition unit 26. The recorder 22 is capable of recording the incoming caller, and specifically, the listing (e.g., name) for which a telephone number is desired by the incoming caller. As such, the communicator for providing the incoming caller information to the operator may comprise a display device 44 (e.g., computer screen) located proximate the operator, such as at the operator's terminal, to communicate the speech recognized information (e.g., locality) to the operator. The communicator may further comprise a replayer 42 for playing back the recorded incoming caller information to the operator. In this regard, the operator's efficiency may be increased as the operator must only input (e.g., type) one piece of data (e.g., the name of the listing for which a telephone number is sought), rather than input two pieces of data (e.g., locality and name). A system for performing speech recognition, recording, displaying and replaying is the ADAS Plus, which is also available from Nortel.

Figure 4:
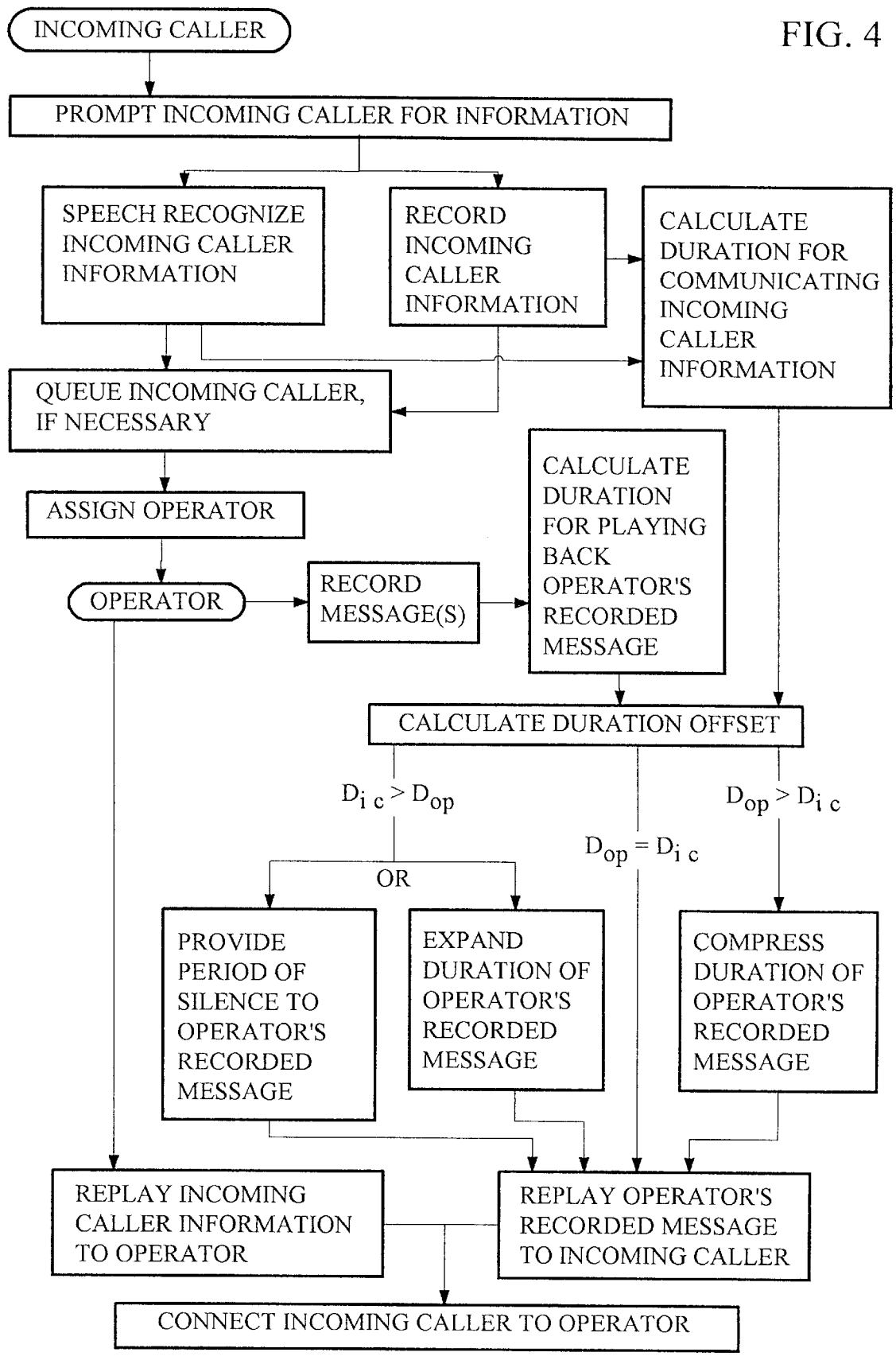
FIG. 4 presents a flowchart of the call handling process according to one embodiment of the present invention.
Figure 5:
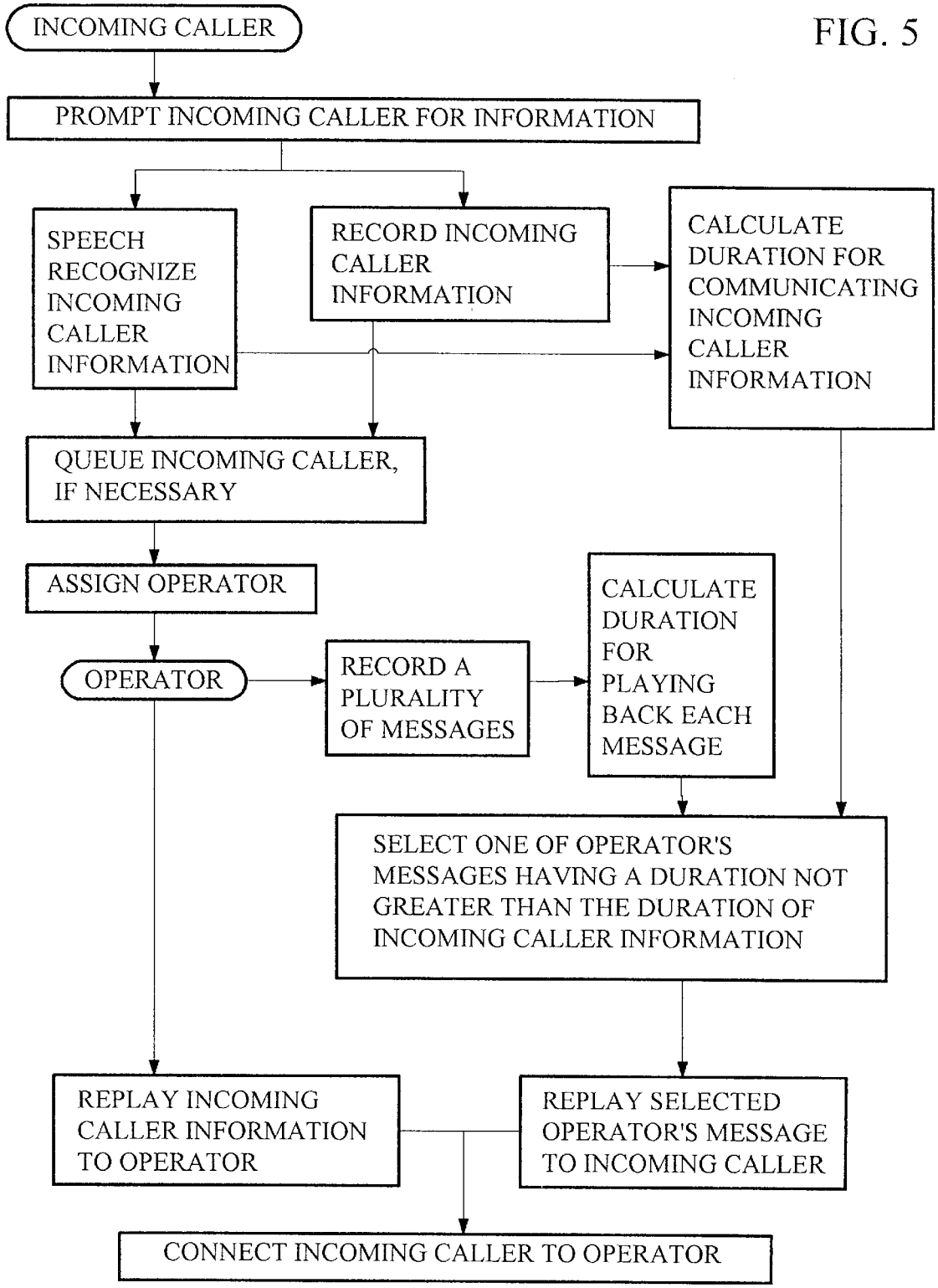
FIG. 5 presents a flowchart of another embodiment of the call handling process according to the present invention.

The incoming caller processing system 10, illustrated in FIGS. 1–3, also includes a recorder 80 for recording at least one message (e.g., greeting) from the operator with whom the incoming caller will be connected and a replayer 90 for playing back to the incoming caller the recorded message of the operator. As the incoming caller information is being communicated to the operator, the incoming caller typically endures a delay. In order to increase customer satisfaction during a period which would otherwise be filled with this delay, the prerecorded operator's messages may be played back to the incoming caller via the operator's replaying system 90 while the incoming caller information (e.g., locality and/or directory listing) is being communicated to the operator. In this regard, and as illustrated in FIGS. 4–5, the operator may record one or more messages for use during the course of a shift. The operator may record the messages, such as greetings, on a recorder 80, illustrated in FIGS. 1–3. The recorder 80 and the replayer 90 are available from Golden Enterprises, Inc. as Personal Response Systems ("PRS"), and are described in U.S. Pat. Nos. 4,918,322, 4,697,282, and 4,623,761, each of which are hereby incorporated by reference herein in their entirety. Alternatively, the operator's messages to be played to the incoming caller may be digitized and stored in random access memory (RAM) or on disk in the primary memory of a computer.

During the period in which the incoming caller information is communicated (e.g., transferred) from the incoming caller to the operator via the communicator 40, the present invention provides for playing a message previously recorded by the operator on the recorder 80 to the incoming caller. Playing a message within the period bounded by the time from which the incoming caller has provided information and to the time at which the operator is actually connected to the incoming caller provides the incoming caller with a degree of comfort. In this regard, the replayer 90 may be activated when the operator to whom the incoming caller will be connected is known, for example, as a result of queuing the incoming caller, as described hereinabove. The replayer 90 will then be activated to play back to the incoming caller a previously recorded message by the operator who will service the directory assistance call by searching for the telephone number using the information previously provided by the incoming caller.

Generally, the operator's recorded message to the incoming caller and the communication of the incoming caller information to the operator may terminate simultaneously. Alternatively, the operator's recorded message to the incoming caller may terminate before all of the incoming caller information is communicated to the operator. In this regard, providing an operator's recorded message having a duration less than or substantially equal to the duration for communicating the incoming caller information to the operator increases the efficiency of the process for handling the incoming call.

Since the duration of the recorded message by the operator (e.g., length of time to play back the operator's recorded message to the incoming caller) may differ from the duration of the incoming caller information (e.g., length of time to communicate the incoming caller information to the operator), and in fact, may be longer than the duration of the incoming caller information, one embodiment of the present invention, the method of which is illustrated in FIG. 4, contemplates calculating the difference in the durations to obtain a duration offset in order to modify, for example, the recorded operator's message to the incoming caller. This may be accomplished by calculating the duration of the incoming caller information ($D_{ic}$) and the duration of the operator's recorded message ($D_{op}$) and calculating the difference therebetween, which yields the duration offset. Calculating the durations of the incoming caller information and the operator's recorded message, as well as the difference therebetween, may be conducted by a means for calculating the durations and difference therebetween 50, 52, 54, illustrated in FIGS. 2–3, which is located in the switch (not shown). The means for calculating the above-noted durations 50, 52 and the difference 54 to obtain the duration offset may be implemented in a conventional application, for example, within Nortel's commercially available Network Application Vehicle (NAV).

As illustrated in FIG. 4, if these durations are not substantially equal, the duration of one of the operator's recorded message and the incoming caller information may be reconfigured such that the recorded operator's message to the incoming caller will end before or substantially at the time the incoming caller information is finished communicating to the operator. For example, if the duration of playing back the operator's recorded message to the incoming caller ($D_{op}$) is less than the duration of playing back the recorded incoming caller information to the operator ($D_{ic}$), the operator's recorded message may be modified by providing a relatively short period of silence, which may be provided to the incoming caller before the operator's recorded message is played back to the incoming caller. The period of silence may have a duration or length less than or substantially equal to the duration offset such that the modified message from the operator to the incoming caller ends prior to or substantially simultaneously with the end of communication of the incoming caller information to the operator. This may be accomplished by a means for providing a period of silence 60, illustrated in FIGS. 2–3, which may comprise, for example, inputting a corresponding number of amplitudes of zero amplitude.

Rather than providing a period of silence, reconfiguring one of the operator's recorded message(s) and the recorded incoming caller information (e.g., locality and/or directory listing) may alternatively comprise altering the duration of one of the operator's recorded message(s) and the recorded incoming caller information such that the duration for playing back the operator's recorded message is less than or substantially equal to the duration for communicating (e.g., playing back a recording) the information provided by the incoming caller to the operator. For example, as illustrated in FIG. 4, where the duration for playing back the operator's recorded message to the incoming caller ($D_{op}$) is greater than the duration for playing back the recorded incoming caller information to the operator ($D_{ic}$) the duration of the operator's recorded message may be compressed by a compression factor, the compression factor being equal to the ratio of the duration of the recorded incoming caller information to the duration of the operator's recorded message. In this regard, the duration of the operator's recorded message may be compressed by the resulting ratio. Conversely, where the duration of the operator's recorded message ($D_{op}$) is less than the duration of the recorded incoming caller information ($D_{ic}$), the duration of the operator's recorded message may be expanded by at least an expansion ratio, the expansion ratio being equal to the ratio of the duration of the recorded incoming caller information to the duration of the operator's recorded message. In this regard, the duration of the recorded operator's message may be expanded by the resulting ratio. Altering the duration of the operator's recorded message may be accomplished by a means for altering 70, shown in FIGS. 2–3. Conventional systems for altering the duration for playing back the operator's recorded message (e.g., systems for speech compression and/or expansion) are commercially available.

In another embodiment, the method of which is illustrated in FIG. 5, the operator may record and have stored in the system 10 a plurality of messages, wherein the messages recorded by the operator are calculated and may vary in duration. In this regard, altering the duration for playing back the operator's recorded messages and/or providing the above-noted inserted period of silence may be obviated or, at the very least, the periods of silence significantly shortened, by selecting an appropriate message from the plurality of messages by the operator for play back to the incoming caller by the replayer 90. In this regard, upon calculation of the duration of communicating the incoming caller information to the operator, the present invention contemplates selecting one of the plurality of the operator's messages for play back to the incoming caller during the replay interval, wherein the selected one message has a duration not greater than (e.g., less than or substantially equal to) the duration of communicating the incoming caller information to the operator. As such, the communication of the incoming caller information to the operator will end after or substantially simultaneously with the end of playing back the recorded operator's message to the incoming caller. For example, a first message recorded by the operator may be relatively short in duration (e.g., about two (2) seconds), while a second message recorded by the operator may be greater in duration than the first message (e.g., about three (3) seconds). In instances where the duration of communicated the incoming caller information is calculated and equals about two and one-half (2.5) seconds, the first message recorded by the operator will be selected such that the communication of the incoming caller information to the operator will end after or substantially simultaneously with the end of playing back the recorded operator's first message to the incoming caller.

After termination of communication of the incoming caller information to the operator, the operator and the incoming caller may be connected such that the directory assistance call may be completed with a human-to-human call processing interface. The operator and the incoming caller may be connected by any of a number of conventional means.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extend permitted by the prior art.

What is claimed is:

1. A method for handling an incoming caller in a call processing system, comprising the steps of:

recording a greeting message from an operator;

recording information provided by the incoming caller;

calculating the duration of the recorded incoming caller information to determine the length of the recorded incoming caller information;

calculating the duration of the recorded greeting message to determine the length of the recorded greeting message;

replaying the recorded incoming caller information to the operator to enable the operator to conduct a search; and replaying the recorded greeting message from the operator to the incoming caller during a replay interval, the replay internal defined as the period in which the recorded incoming caller information is played back to the operator, such that at least a portion of the recorded incoming caller information is communicated to the operator while at least a portion of the recorded greeting message from the operator is played to the incoming caller.

2. A method, as claimed in claim 1, further comprising the step of:

prompting the incoming caller for information.

3. A method, as claimed in claim 2, wherein said prompting step comprises the steps of:

recording at least a first request for information message; and replaying at least the first request for information message to the incoming caller to solicit information from the incoming caller.

4. A method, as claimed in claim 3, wherein the first request for information concerns a locality to be searched.

5. A method, as claimed in claim 3, wherein said step of recording incoming caller information comprises recording the locality to be searched.

6. A method, as claimed in claim 3, further comprising the steps of:

recording a second request for information message; and replaying the second request for information message to the incoming caller to solicit information from the incoming caller, the second request being different than the first request.

7. A method, as claimed in claim 6, wherein the second request for information message concerns a directory listing to be searched.

8. A method, as claimed in claim 1, further comprising the steps of:

recording a handoff message;

replaying the recorded handoff message to the incoming caller after said step of recording incoming caller information to inform the incoming caller of a forthcoming connection to the operator.

9. A method, as claimed in claim 1, further comprising the step of:

placing the incoming caller in a queue for the operator.

10. A method, as claimed in claim 1, wherein said step of recording the greeting message comprises the step of:

recording a plurality of greeting messages by the operator, wherein each of the plurality of recorded greeting messages have a duration different from the duration of the other recorded greeting messages, said method further comprising;

calculating the duration of each of the recorded greeting messages to determine the length of each of the recorded greeting messages; and comparing the duration of the recorded incoming caller information to the durations of the recorded greeting messages to select one of the plurality of recorded greeting messages.

11. A method, as claimed in claim 10, wherein the selected one of the plurality of recorded greeting messages has a duration not greater than the duration of the recorded incoming caller information.

12. A method, as claimed in claim 1, further comprising the step of:

connecting the incoming caller to the operator after said step of replaying the recorded greeting message to the incoming caller to enable the operator to assist the incoming caller via a human-to-human interface.

13. A method for handling at incoming caller in a call processing system, comprising the steps of:

recording a greeting message from an operator;

recording information provided by the incoming caller;

calculating the difference between the duration of the recorded incoming caller information and the duration of the recorded greeting message to obtain a duration offsets;

replaying the recorded incoming caller information to the operator to enable the operator to conduct a search; and replaying the recorded greeting message from the operator to the incoming caller during a replay interval, the replay interval defined as the period in which the recorded incoming caller information is played back to the operator, such that at least a portion of the incoming caller information is communicated to the operator while at least a portion of the recorded greeting message from the operator is played to the incoming caller.

14. A method, as claimed in claim 13, wherein the duration of the recorded incoming caller information is greater than the duration of the recorded greeting message to provide a duration offset greater than zero.

15. A method, as claimed in claim 14, further comprising the step of:

providing a period of silence to the incoming caller during said step of replaying the recorded incoming caller information, the period of silence having a duration less than or equal to the duration offset.

16. A method, as claimed in claim 15, wherein said step of providing the period of silence is conducted before said step of replaying the recorded greeting message to the incoming caller.

17. A method, as claimed in claim 14, further comprising the step of:

altering the duration of one of the recorded incoming caller information and recorded greeting message such that the duration of the recorded greeting message is less than or substantially equal to the duration of the recorded incoming caller information.

18. A method, as claimed in claim 17, wherein said altering step comprises the steps of:

calculating a ratio of the duration of the recorded incoming caller information to the duration of the recorded greeting message to obtain a compression factor;

compressing the duration of the recorded incoming caller information to reduce the length of the recorded incoming caller by the compression factor.

19. A method, as claimed in claim 17, wherein said altering step comprises the steps of:

calculating a ratio of the duration of the recorded incoming caller information to the duration of the recorded greeting message to obtain an expansion factor;

expanding the duration of the recorded greeting message to increase the length of the recorded greeting message by the expansion factor.

20. A method, as claimed in claim 13, wherein the duration of the recorded incoming caller information is less than the duration of the recorded greeting message, said method further comprising the step of:

altering the duration of one of the recorded incoming caller information and recorded greeting message such that the duration of the recorded greeting message is less than or substantially equal to the duration of the recorded incoming caller information.

21. A method, as claimed in claim 20, wherein said altering step comprises the steps of:

calculating a ratio of the duration of the recorded incoming caller information to the duration of the recorded greeting message to obtain a compression factor; and compressing the duration of the recorded greeting message to reduce the length of the recorded greeting message by the compression factor.

22. A method, as claimed in claim 20, wherein said altering step comprises:

calculating a ratio of the duration of the recorded incoming caller information to the duration of the recorded greeting message to obtain an expansion factor; and expanding the duration of the recorded incoming caller information to increase the length of the recorded incoming caller information by the expansion factor.

23. A method for handling an incoming caller in a caller processing facility, comprising the steps of:

recording at least a first message from an operator;

processing at least a portion of information provided by the incoming caller, wherein said processing step comprises the step of recording information provided by the incoming caller;

modifying at least one of the recorded incoming caller information and the recorded first message from the operator such that the duration of the recorded first message from the operator is less than or substantially equal to the duration of the recorded incoming caller information;

communicating the incoming call information to the operator to enable the operator to conduct a search, wherein said communicating step comprises replaying the incoming call information to the operator; and replaying the first message from the operator to the incoming caller during at least a portion of a communication interval, wherein the communication interval is defined as the period in which the incoming caller information is communicated to the operator, such that at least a portion of the first message is played to the incoming caller while at least a portion of the incoming caller information is communicated to the operator.

24. A method, as claimed in claim 23, further comprising the step of:

prompting the incoming caller for information, the information comprising at least one of locality and directory listing.

25. A method, as claimed in claim 23, wherein said modifying step comprises the step of:

providing a period of silence to the recorded first message by the operator.

26. A method, as claimed in claim 23, wherein said modifying step comprises the step of:

altering the duration of at least one of the recorded incoming caller information and the recorded first message from the operator.

27. A method, as claimed in claim 26, wherein said altering step comprises the step of:

compressing the duration of the recorded first message from the operator.

28. A method, as claimed in claim 26, wherein said altering step comprises the step of:

expanding the duration of the recorded first message from the operator.

29. A method, as claimed in claim 23, wherein said step of recording at least the first message comprises the step of recording a plurality of messages, the messages each having a different duration, wherein said method further comprises the step of:

selecting one of the plurality of messages for use in said replaying step to the incoming caller, wherein the one of the plurality of messages has a duration less than or substantially equal to the duration of the recorded information provided by the incoming caller.

30. A system for handling calls from incoming callers comprising:

processor for processing information provided by the incoming caller;

communicator for providing the incoming caller information to an operator to enable the operator to conduct a search based upon the incoming caller information;

recorder for recording one or more messages from the operator;

replayer for playing back said one or more messages of the operator to the incoming caller while the incoming caller information is being communicated to the operator; and means for calculating a duration offset, wherein the duration offset is the difference in durations for communicating the information provided by the incoming caller to the operator and for playing back said one or more message from the operator to the incoming caller.

31. A system, as claimed in claim 30, wherein said processor is a recorder capable of recording information provided by the incoming caller.

32. A system, as claimed in claim 31, wherein said communicator is a replayer for playing back the information of the incoming caller recorded by said recorder.

33. A system, as claimed in claim 30, wherein said processor is a speech recognition system capable of identifying information provided by the incoming caller.

34. A system, as claimed in claim 33, wherein said information identified by said speech recognition system comprises information selected from the group consisting of locality and directory listing.

35. A system, as claimed in claim 33, wherein said communicator is a means for displaying to the operator information identified by said speech recognition system.

36. A system, as claimed in claim 30, further comprising:

means for calculating the duration for communicating the information provided by the incoming caller to the operator; and means for calculating the duration for playing said message from the operator to the incoming caller.

37. A system, as claimed in claim 30, further comprising:

means for modifying the duration of one of the durations for communicating the information provided by the incoming caller to the operator and for playing said message from the operator to the incoming caller such that the duration for communicating the information provided by the incoming caller to the operator is greater than or substantially equal to the duration for playing said message from the operator to the incoming caller.

38. A system, as claimed in claim 37, wherein said means for modifying comprises means for providing a period of silence to the incoming caller in conjunction with said message from the operator, said period of silence having a duration less than or substantially equal to said duration offset.

39. A system, as claimed in claim 37, wherein said means for modifying comprises means for altering the duration of one of the durations for communicating the information provided by the incoming caller to the operator and for playing said message from the operator to the incoming caller such that the duration of the information provided by the incoming caller is greater than or substantially equal to the duration of said message from the operator.

40. A system, as claimed in claim 39, wherein said means for altering the duration is selected from the group consisting of a speech compression system and a speech expansion system.

41. A method for handling an incoming caller in a call processing system, comprising the steps of:
  recording a greeting message from an operator;
  recording information provided by the incoming caller;
  replaying the recorded incoming caller information to the operator to enable the operator to conduct a search;
  calculating the duration of the recorded incoming caller information to determine the length of the recorded incoming caller information;
  calculating the duration of the recorded greeting message to determine the length of the recorded greeting message; and
  replaying the recorded greeting message from the operator to the incoming caller during a replay interval, the replay interval defined as the period in which the recorded incoming caller information is played back to the operator.

42. A method for handling an incoming caller in a call processing system, comprising the steps of:
  recording a greeting message from an operator;
  recording information provided by the incoming caller;
  calculating the difference between the duration of the recorded incoming caller information and the duration of the recorded greeting message to obtain a duration offset;
  replaying the recorded incoming caller information to the operator to enable the operator to conduct a search; and
  replaying the recorded greeting message from the operator to the incoming caller during a replay interval, the replay interval defined as the period in which the recorded incoming caller information is played back to the operator.

43. A method for handling an incoming caller in a caller processing facility, comprising the steps of:
  recording at least a first message from an operator;
  processing at least a portion of information provided by the incoming caller, said processing step comprising the step of recording information provided by the incoming caller;
  communicating the incoming caller information to the operator to enable the operator to conduct a search, said communicating step comprising replaying the incoming caller information to the operator;
  modifying at least one of the recorded incoming caller information and the recorded first message from the operator such that the duration of the recorded first message from the operator is less than or substantially equal to the duration of the recorded incoming caller information; and
  replaying the first message from the operator to the incoming caller during at least a portion of a communication interval, wherein the communication interval is defined as a period in which the incoming caller information is communicated to the operator.

44. A system for handling calls from incoming callers comprising:
  processor for processing information provided by the incoming caller;
  communicator for providing the incoming caller information to an operator to enable the operator to conduct a search based upon the incoming caller information;
  recorder for recording one or more messages from the operator;
  means for calculating a duration offset, or in the duration offset is the difference in durations for communicating the information provided by the incoming caller to the operator and for playing said message from the operator to the incoming caller; and
  replayer for playing back said one or more messages of the operator to the incoming caller while the incoming caller information is being communicated to the operator.

45. A method for handling an incoming caller in a call processing system, comprising the steps of:
  recording a message from an operator;
  recording information provided by the incoming caller;
  replaying, after said step of recording information provided by the incoming caller, the recorded message from the operator to the incoming caller during a replay interval, the replay interval defined as the period in which the recorded message from the operator is played to the incoming caller; and
  replaying the recorded incoming caller information to the operator during at least a portion of the replay interval to enable the operator to conduct a search.

* * * * *